United States Patent Office 2,759,361
Patented Aug. 21, 1956

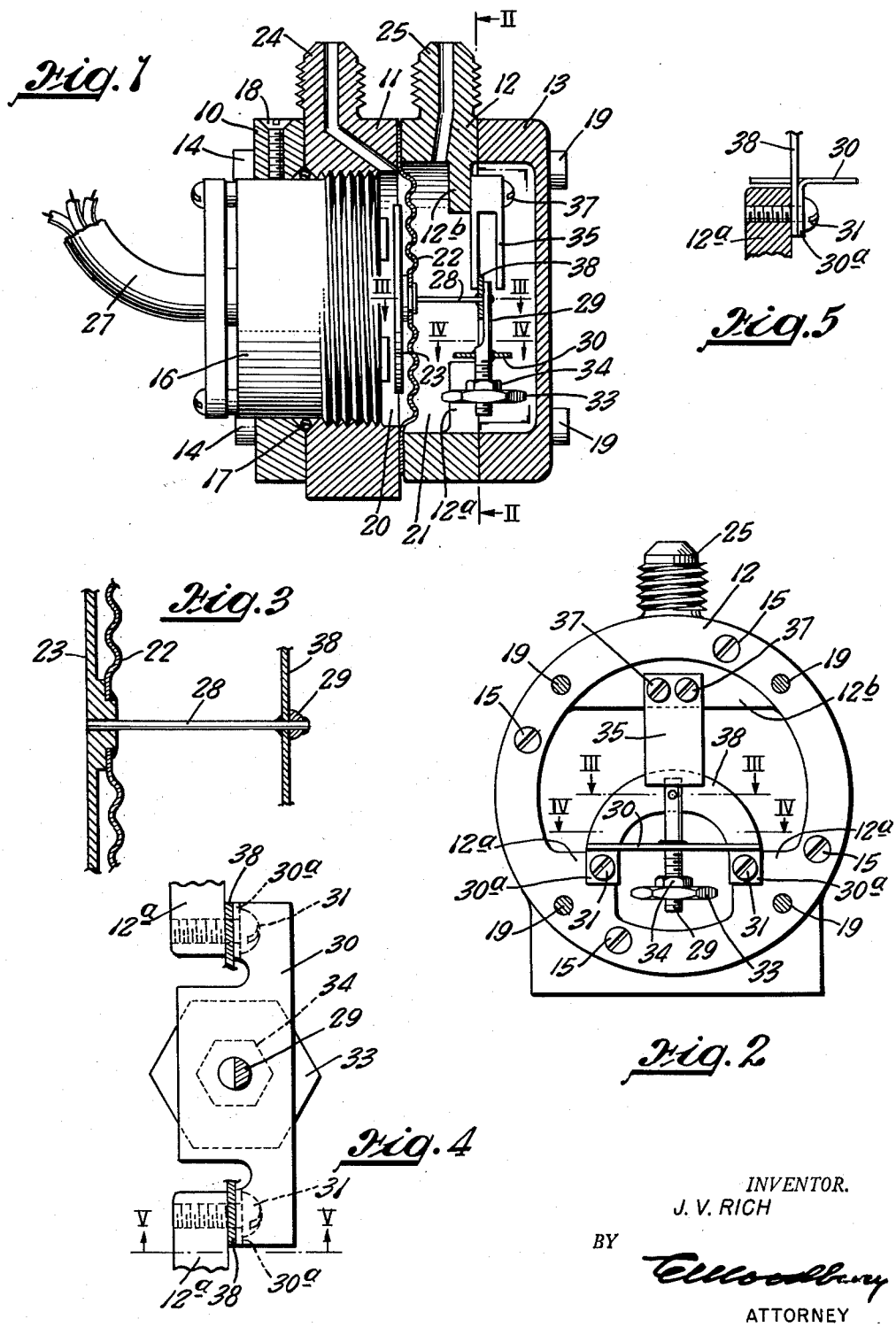

2,759,361

DYNAMICALLY BALANCED GAUGE

Jack V. Rich, Sherman Oaks, Calif., assignor to Bendix Aviation Corporation, North Hollywood, Calif., a corporation of Delaware Application October 27, 1952, Serial No. 316,966

1 Claim. (Cl. 73—398)

This invention relates to gauges for measuring pressures and the like, and which are exposed to vibration, or acceleration, and particularly to pressure-responsive pickups for converting pressure values into electrical values for transmission to a distance.

An object of the invention is to provide a simple and practicable pressure-responsive instrument, the operation of which is substantially unaffected by acceleration.

Other more specific objects and features of the invention will become apparent from the description to follow.

Briefly, the present invention applies to instruments such as those of the diaphragm type in which the moving element is restricted to linear motion and has appreciable mass so that it is undesirably sensitive to acceleration in directions having a component parallel to the said linear motion. Such undesirable sensitivity to acceleration forces is reduced in a practicable manner in accordance with the invention by connecting the movable element to one end of a lever which is fulcrumed intermediate its ends and has an adjustable counterbalancing mass on its other end. Since any acceleration tending to shift the movable element in one direction tends to move the counterbalancing mass in the same direction, and the lever connection therebetween permits them to move only in opposite directions, substantial immunity to acceleration can be obtained by properly proportioning the counterbalancing mass as to its weight and distance from the fulcrum.

A full understanding of the invention can be had from the following description of the drawing, in which:

Fig. 1 is a longitudinal sectional view through a differential pressure pickup in accordance with the invention;

Fig. 2 is a cross sectional view taken in the plane II—II of Fig. 1;

Fig. 3 is a detail sectional view of certain of the elements of the instrument taken in the plane III—III of Fig. 2; and Fig. 4 is a detail section taken in the plane IV—IV of Fig. 2; and Fig. 5 is a detail section taken in the plane V—V of Fig. 4.

Referring to Fig. 1, the pressure pickup therein depicted has a body consisting of four sections 10, 11, 12 and 13 respectively. The sections 10, 11 and 12 are in the form of rings which seal against each other. The last section 13 constitutes a cover or back which closes the right end of the body. Section 10 is joined to section 11 by screws 14 which pass through section 10 and screw into the section 11 and section 12 is joined to the section 11 by screws 15 (Fig. 2) which pass through the section 12 and screw into the section 11. Section 13 is detachably secured to sections 12 and 11 by screws 19 which pass through sections 13 and 12 and screw into section 11. The joints between the sections are sealed by the use of a suitable varnish or other sealer. The left end of the housing is closed by an inductor unit 16 which is in the form of an externally threaded plug which screws into the section 11. The peripheral surface of the unit 16 is sealed with respect to the body by means of an O ring seal or gasket 17 interposed in a groove defined by chamfered adjacent edges of the sections 10 and 11. The inductor unit 16 is adjustable longitudinally with respect to the body by rotating it in one direction or the other and it can then be locked in position by means of a set screw 18.

The interior of the body is divided into two hermetically sealed chambers 20 and 21 respectively by a diaphragm 22 that is clamped between the body sections 11 and 12. There is secured to the center of the diaphragm 22 a disk, or pad 23, as it is commonly referred to, which cooperates with the inductor unit 16. This unit 16 may contain a coil having poles adjacent the pad 23, the electrical properties of the coil being varied by movement in one direction or the other of the pad 23. Such elements are old in the art and need not be further described herein.

Two pressures to be compared may be applied to the chambers 20 and 21 respectively by means of nipples 24 and 25 respectively. Any difference between these two pressures will move the diaphragm 22 and the pad 23 in one direction or the other to thereby alter the electrical characteristics of the unit 16. The inductor unit 16 may be connected to suitable apparatus at a remote point by an electrical conducting cable 27.

Within the chamber 21 the center of the diaphragm 22 is connected to one end of a link 28, the other end of which is connected to one end of a lever 29. This lever 29 is fulcrumed intermediate its ends by attachment to a metallic strip 30, the opposite ends of which are provided with ears 30a (Fig. 2) which are anchored by screws 31 to flanges 12a extending inwardly from the body section 12. The lever 29 is threaded on the end beyond the fulcrum strip 30 and is provided with a balance nut 33 of substantial mass, and a lock nut 34.

A forked bracket 35 is secured to an inwardly projecting flange 12b on the body section 12 by screws 37. This bracket has its opposite walls positioned in spaced relation to each other and on opposite sides of the projecting end of the lever 29 beyond the point of attachment thereto of the link 28, to limit the range of movement of the diaphragm 22 and pad 23.

By properly choosing the weight of the nuts 33 and 34 and adjusting them to the proper longitudinal point on the lever 29, the moment of inertia of the nuts 33, 34 and the end of the lever to which they are attached can be made equal to the moment of inertia of the remainder of the lever 29, the link 28, the diaphragm 22, and the pad 23. Under these conditions sudden movement of the instrument, say to the left, will develop an inertia force in the pad 23, diaphragm 22 and associated elements, tending to move them to the right relative to the body of the device. A similar inertia force will be developed in the nuts 33, 34, and the adjacent end of the lever. However, if the moments of inertia of these two groups of masses are balanced, there will be no resultant movement of the whole system.

The strip 30 constitutes a simple and practicable fulcrum support since it has sufficient resilience to offer little resistance to rocking movement of the lever 29 but offers strong resistance to bodily movement of the lever in the direction parallel to the direction of movement of the diaphragm 22.

Adjustment of the instrument for dynamic balance can be readily made by removing the screws 19 and the cover section 13 of the body and rotating the nut 33 on the lever 29, after first releasing the lock nut 34.

Usually a spring centering force supplementing that of the fulcrum strip 30 should be applied to the movable elements to normally retain them in a desired neutral position and offer restoring force of a uniformly varying value. Such a restoring spring is provided in accordance with the present invention by a U-shaped, generally semi-circular flat spring element 38, the ends of which are anchored under the screws 31, 31, and the mid section (bight) of which is soldered or brazed to the pin 28 and the lever 29 as clearly shown in Fig. 3.

Although for the purpose of explaining the invention, a particular embodiment thereof has been shown and described, obvious modifications will occur to a person skilled in the art, and I do not desire to be limited to the exact details shown and described.

I claim:

In a telemetering pressure pickup: a diaphragm and a body cooperating therewith defining separate fluid chambers on opposite sides of said diaphragm, whereby the diaphragm is differentially responsive to pressures in said respective chambers; pickup means comprising physically separate elements mounted on said body and said diaphragm, respectively, and responsive to the spacing between said elements; a U-shaped planar integral flat spring element in one of said chambers juxtaposed and parallel to said diaphragm, and means rigidly connecting the bight of said U-shaped element to said diaphragm for movement therewith; said body having a pair of supporting shoulders lying against the end portions of said U-shaped element; a lever secured at one end to said bight of the U-shaped element and extending therefrom between the said ends thereof; a lever-supporting flat spring element lying in a plane perpendicular to the plane of said U-shaped flat spring element and extending from one end to the other of the U-shaped element and having angled supporting lugs at its ends juxtaposed to and lying against said end portions of said U-shaped element that lie against said body-supporting shoulders; means clamping said juxtaposed portions of the U-shaped element and said flat spring element against said supporting shoulders; said lever extending through and being secured to said lever-supporting element substantially at its midpoint; and mass means on the portion of said lever projecting beyond said lever-supporting element.

References Cited in the file of this patent

UNITED STATES PATENTS

| | | |
|---|---|---|
| 2,311,900 | Newell | Feb. 23, 1943 |
| 2,368,905 | Wallace | Feb. 6, 1945 |
| 2,446,546 | Meston | Aug. 10, 1948 |
| 2,545,530 | Peterson | Mar. 20, 1951 |
| 2,692,501 | Erwood | Oct. 26, 1954 |